(12) United States Patent
Nakauchi et al.

(10) Patent No.: US 10,173,731 B2
(45) Date of Patent: Jan. 8, 2019

(54) SIDE CHASSIS STRUCTURE OF VEHICLE

(71) Applicant: MAZDA MOTOR CORPORATION, Hiroshima (JP)

(72) Inventors: Shigeru Nakauchi, Hiroshima (JP); Nobuyuki Nakayama, Aki-gun (JP); Takayuki Nakamae, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/513,913

(22) PCT Filed: Oct. 4, 2016

(86) PCT No.: PCT/JP2016/079390
§ 371 (c)(1),
(2) Date: Mar. 23, 2017

(87) PCT Pub. No.: WO2017/077800
PCT Pub. Date: May 11, 2017

(65) Prior Publication Data
US 2017/0282975 A1 Oct. 5, 2017

(30) Foreign Application Priority Data

Nov. 6, 2015 (JP) .................................. 2015-218044

(51) Int. Cl.
*B62D 29/00* (2006.01)
*B62D 25/12* (2006.01)
(Continued)

(52) U.S. Cl.
CPC .............. *B62D 25/12* (2013.01); *B60R 21/34* (2013.01); *B62D 25/163* (2013.01); *B60R 13/04* (2013.01);
(Continued)

(58) Field of Classification Search
CPC .. B62D 21/152; B62D 25/082; B62D 21/155; B62D 25/08; B62D 21/11; B62D 25/04; B62D 25/025
(Continued)

(56) References Cited

U.S. PATENT DOCUMENTS

| 5,303,973 A * | 4/1994 | Fujii | B62D 25/084 296/203.02 |
| 2008/0067838 A1* | 3/2008 | Nakamae | B62D 21/152 296/203.02 |

(Continued)

FOREIGN PATENT DOCUMENTS

| EP | 1 138 579 A2 | 10/2001 |
| JP | 2001-287669 A | 10/2001 |

(Continued)

OTHER PUBLICATIONS

International Search Report issued in PCT/JP2016/079390; dated Nov. 8, 2016.

*Primary Examiner* — D Glenn Dayoan
*Assistant Examiner* — Sunsurraye Westbrook
(74) *Attorney, Agent, or Firm* — Studebaker & Brackett PC

(57) ABSTRACT

Present application discloses side chassis structure. Side chassis structure includes: apron reinforcement member; fender panel covering outside of the apron reinforcement member; and brackets connected to the fender panel. At least one of the brackets includes: main body including support portion supporting fender panel; front leg portion extending downward from front end of inner portion of main body in vehicle width direction, front leg portion being attached to apron reinforcement member; and rear leg portion which extends downward from rear end of the main body, rear leg portion being attached to apron reinforcement member. Front leg portion has inner slotted hole having long axis extending in vehicle width direction, and outer slotted hole which is formed outside inner slotted hole in vehicle width direction, outer slotted hole having long axis longer than long axis of inner slotted hole.

14 Claims, 9 Drawing Sheets

(51) Int. Cl.
    *B62D 25/16*     (2006.01)
    *B60R 21/34*     (2011.01)
    *B60R 13/04*     (2006.01)
    *E05F 5/06*     (2006.01)

(52) U.S. Cl.
    CPC ........ *B60R 2021/343* (2013.01); *B62D 25/16* (2013.01); *B62D 29/008* (2013.01); *E05F 5/06* (2013.01)

(58) Field of Classification Search
    USPC ... 296/187.09, 193.09, 204, 193.11, 29, 207, 296/96.21; 293/133, 115; 180/274, 232, 180/68.1, 69.2
    See application file for complete search history.

(56) References Cited

U.S. PATENT DOCUMENTS

| | | | |
|---|---|---|---|
| 2013/0193779 A1* | 8/2013 | Kuroda | H02K 33/12 310/15 |
| 2015/0158445 A1* | 6/2015 | Sogabe | B60R 19/12 296/187.04 |
| 2015/0298742 A1* | 10/2015 | Ono | B62D 21/11 296/187.09 |
| 2016/0031484 A1* | 2/2016 | Nakauchi | B60R 19/24 296/187.09 |
| 2017/0050597 A1* | 2/2017 | Hammer | B60R 19/34 |

FOREIGN PATENT DOCUMENTS

| | | |
|---|---|---|
| JP | 2012-176636 A | 9/2012 |
| JP | 2015-112918 A | 6/2015 |

\* cited by examiner

SIDE CHASSIS STRUCTURE OF VEHICLE

TECHNICAL FIELD

The present invention relates to a side chassis structure in which a fender panel is supported on an apron reinforcement member via brackets.

BACKGROUND ART

A structure in which a fender panel is attached to an upper end portion of an apron reinforcement member via brackets has been conventionally known, the apron reinforcement member extending in the front-rear direction of the chassis (c.f. Patent Document 1). In addition to the primary fender support function of supporting the fender panel, it is required for the brackets to have a function of reducing damage to a colliding body (such as a pedestrian) hit by the vehicle and thrown on the hood, i.e., an impact force absorbing function for absorbing an impact force which the colliding body receives from the hood. In addition to these functions, it is required for the brackets to have a load reception function for receiving a load, which is caused when the hood is closed, if a hood stopper is attached to the brackets.

A side chassis structure described in Patent Document 2 includes an apron reinforcement member and a fender panel which is supported on the apron reinforcement member via a bracket. The front end portion of the apron reinforcement member is connected to a front side frame. The bracket includes leg portions and an attachment surface portion. The leg portions extend outward in the vehicle width direction and diagonally upward. The leg portions are connected to an upper surface of the apron reinforcement member. A support portion is formed on the attachment surface portion in order to support the fender panel.

A hood stopper is situated at an inner position in the vehicle width direction than the support portion of the attachment surface portion. Accordingly, the side chassis structure according to Patent Document 2 may have functions of distributing a collision load, easily deforming the brackets and withstanding a shock of the hood being closed even though the front end portion of the fender panel is situated at an outer side in the vehicle width direction than the front end portion of the apron reinforcement member.

There are a variety of vehicle designs. Among these designs, there is a structure in which a front end portion of a fender panel is situated near a front end portion of an apron reinforcement member. With regard to such a structure, there may be a too short vertical separation distance between the front end portions of the fender panel and the apron reinforcement member. In this case, an impact force which the colliding body receives from the hood may not be sufficiently absorbed by the bracket structure according to Patent Document 1 or 2.

With regard to a mechanism of impact force absorption by the bracket according to Patent Document 1 or 2, when a downward load acts on the bracket from above, buckling or crushing deformation happens to the leg portions. The impact force absorbing function of the bracket is dependent on the separation distance (deformation stroke) between the front end portions of the fender panel and the apron reinforcement member. If the deformation stroke (so-called vertical length of the bracket) is insufficient, the impact force is not sufficiently absorbed.

PATENT DOCUMENT

Patent Document 1: JP 2015-112918 A
Patent Document 2: JP 2012-176636 A

SUMMARY OF INVENTION

An object of the present invention is to provide a side chassis structure configured to sufficiently absorb an impact force. The impact force may be sufficiently absorbed even when a bracket having a small vertical length is used in the side chassis structure.

A side chassis structure according to one aspect of the present invention includes an apron reinforcement member extending in a front-rear direction of a chassis; a fender panel situated so as to cover an outside of the apron reinforcement member in the vehicle width direction; and brackets connected to the fender panel. The fender panel is supported on the apron reinforcement member via the brackets, and at least one of the brackets includes (i) a main body having a support portion which supports the fender panel, (ii) a front leg portion extending vertically downward from a front end portion of an inner portion of the main body in the vehicle width direction, the front leg portion being attached to the apron reinforcement member, and (iii) a rear leg portion extending vertically downward from a rear end portion of the main body, the rear leg portion being attached to the apron reinforcement member. The support portion is formed outside the main body in the vehicle width direction. The front leg portion has (a) an inner slotted hole having a long axis extending in the vehicle width direction, and (b) an outer slotted hole which is formed outside the inner slotted hole in the vehicle width direction, the outer slotted hole having a long axis longer than the long axis of the inner slotted hole.

The aforementioned side chassis structure may sufficiently absorb an impact force even when a bracket having a small vertical length is used in the side chassis structure.

Objects, features, and advantages of the present invention will become more apparent from the following detailed description and attached drawings.

DESCRIPTION OF EMBODIMENTS

An exemplary side chassis structure is described with reference to the drawings. The principles of the present embodiment, however, are not limited to the following structures or shapes. A person skilled in the art may modify the following structures or shapes to form various side chassis structures.

Figure 1:
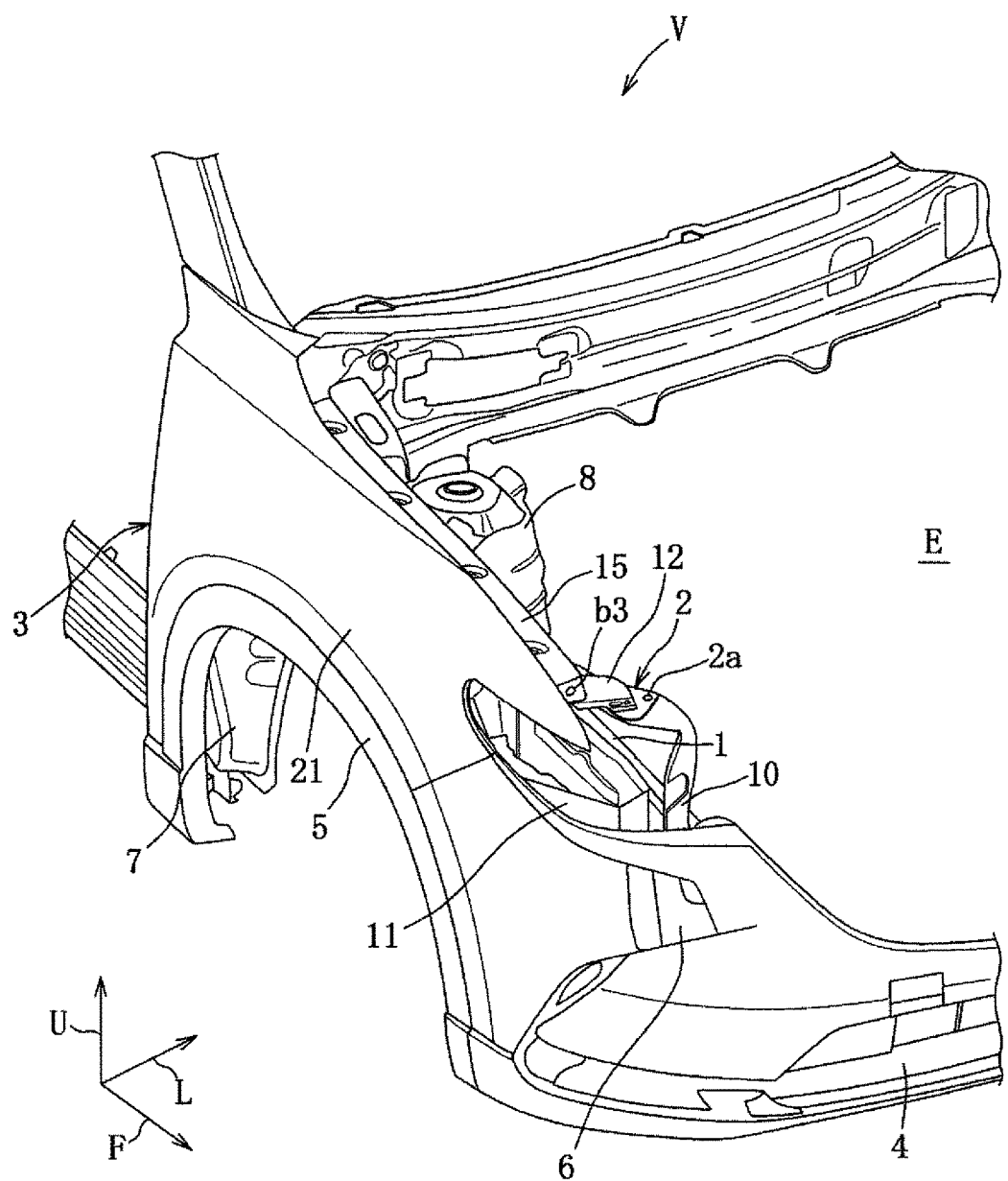
FIG. 1 is a perspective view (front and right) of an exemplary side chassis structure.

FIG. 1 is a perspective view of the side chassis structure, the perspective view showing a front-right portion of a vehicle V. The vehicle V is described with reference to FIG. 1.

The vehicle V includes two front side frames 1, two apron reinforcement members 2, two front fender panels (hereafter referred to as "fender panels 3") and a hood (not shown). One of the two front side frames 1 extends in the front-rear direction of the vehicle V on a left portion of the vehicle V. The other of the two front side frames 1 extends in the front-rear direction of the vehicle V on a right portion of the vehicle V. One of the two apron reinforcement members 2 extends in the front-rear direction of the vehicle V on the left portion of the vehicle V. The other of the two apron reinforcement members 2 extends in the front-rear direction of the vehicle V on the right portion of the vehicle V. One of the two fender panels 3 forms the left portion of the vehicle V, and covers the outside of the vehicle V in the vehicle width direction. The other of the two fender panels 3 forms the right portion of the vehicle V, and covers the outside of the vehicle V in the vehicle width direction. The hood is situated over an engine room E to cover the engine room E.

The two front side frames 1, the two apron reinforcement members 2 and the two fender panels 3 form a symmetric structure. The right structure is mainly described below. The description of the right structure is applicable to the left structure. The arrow F means "forward" in the drawings. The arrow L means "leftward" in the drawings. The arrow U means "upward" in the drawings.

Figure 2:
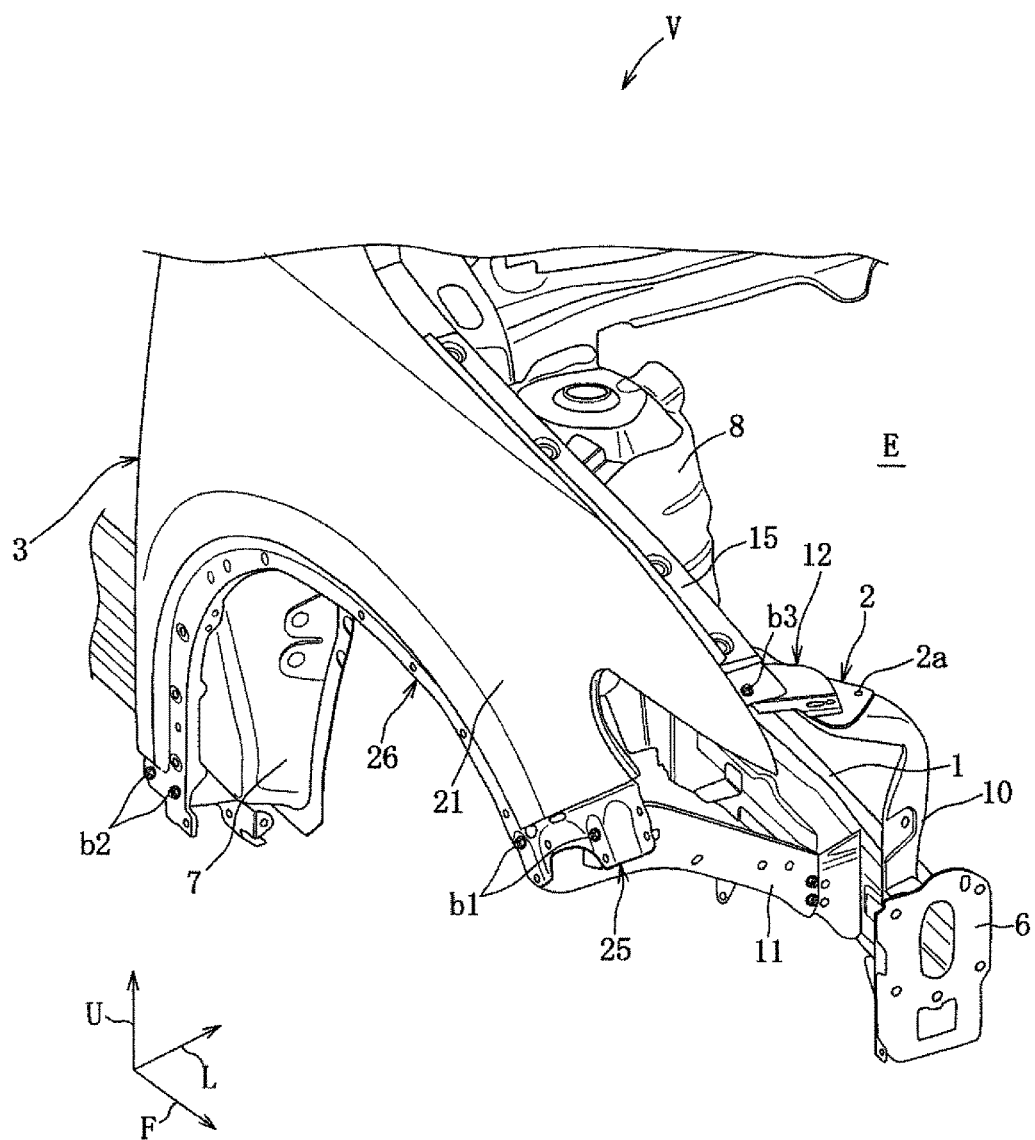
FIG. 2 is a perspective view of the side chassis structure shown in FIG. 1, wherein a bumper fascia and an overfender are removed from the side chassis structure.
Figure 3:
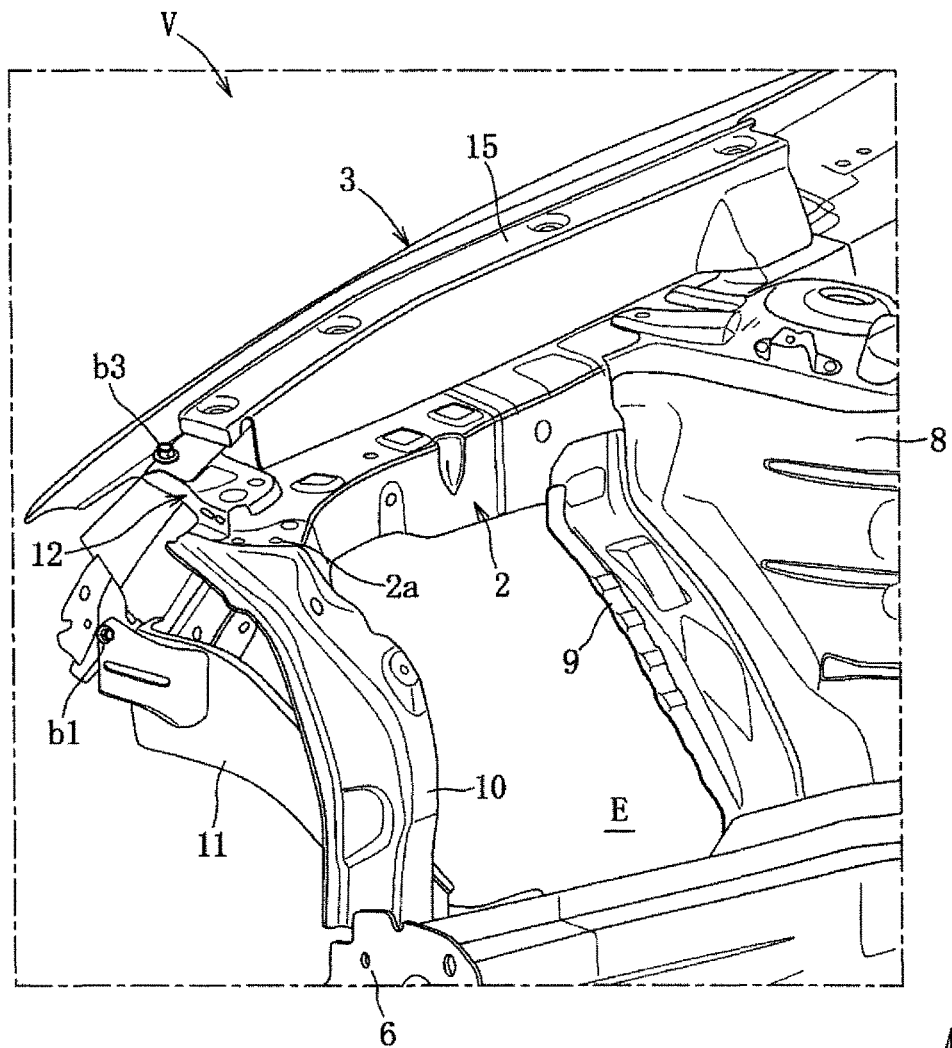
FIG. 3 is a perspective view of the side chassis structure shown in FIG. 2 (engine room side).
Figure 3:
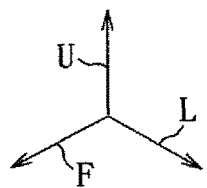
Figure 4:
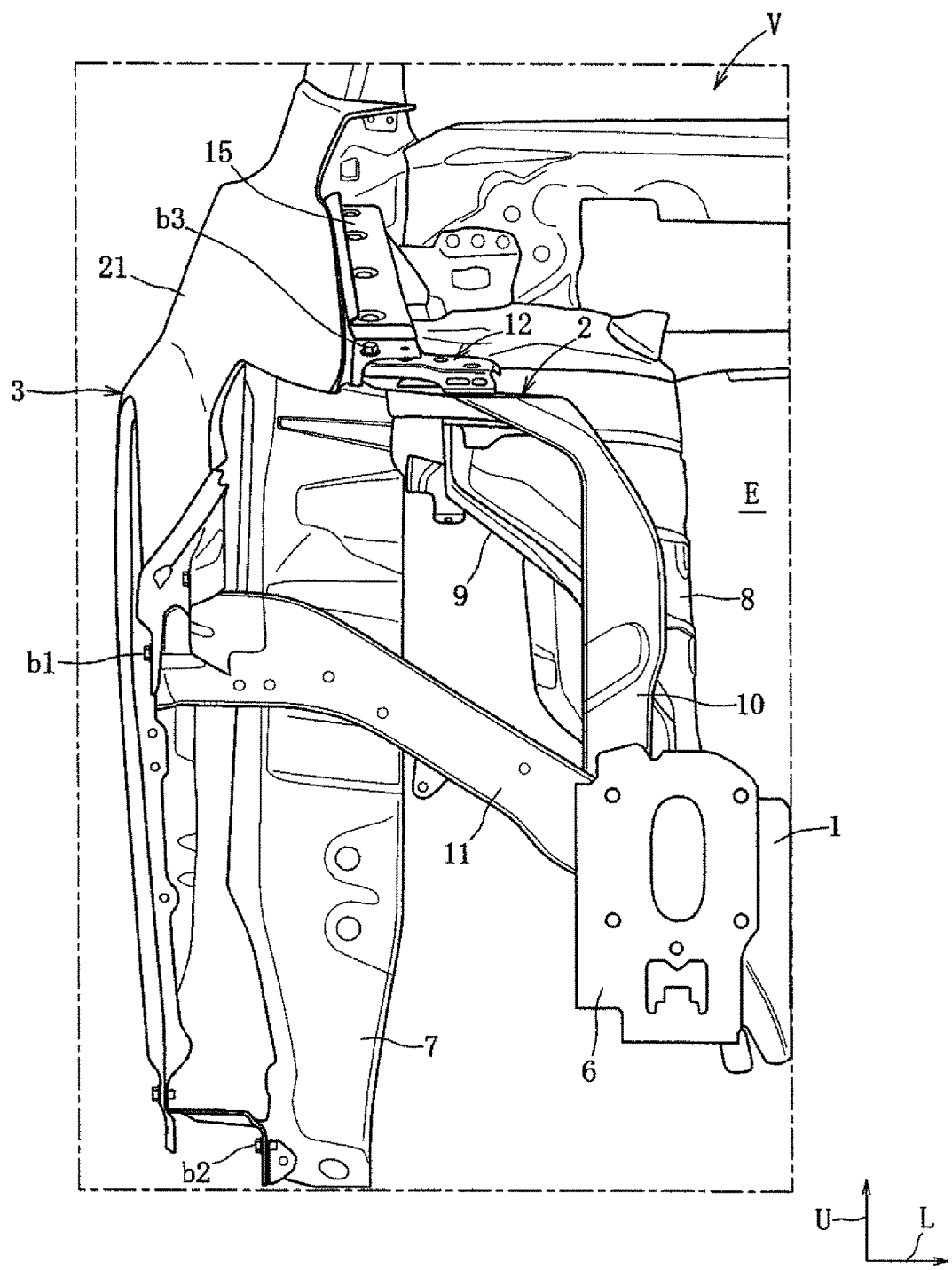
FIG. 4 is a front view of the side chassis structure shown in FIG. 2.
Figure 5:
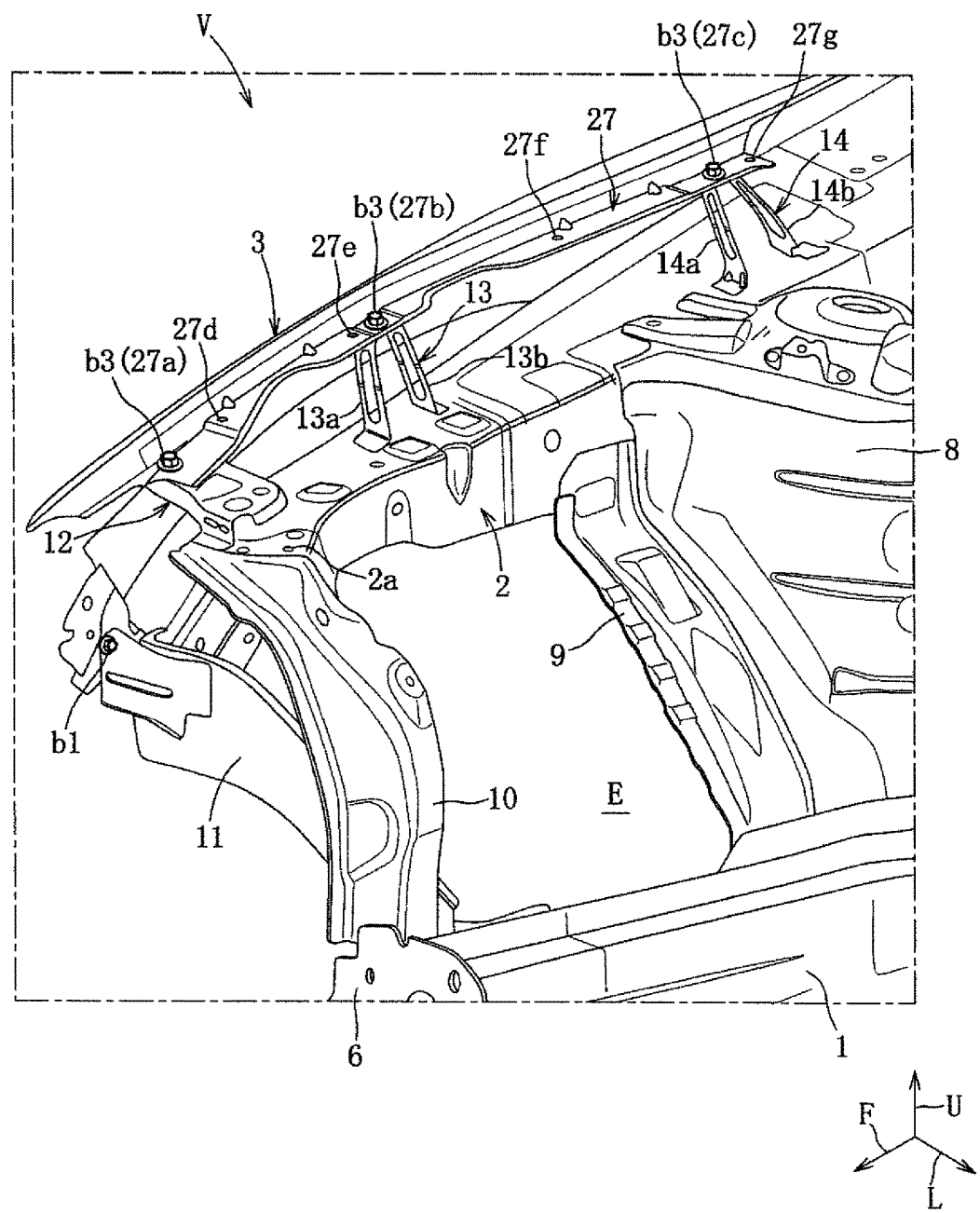
FIG. 5 is a perspective view of the side chassis structure shown in FIG. 3, wherein an edge cover is removed from the side chassis structure.

FIG. 2 is a perspective view of the side chassis structure. A bumper fascia 4 and an overfender 5 are removed from the side chassis structure shown in FIG. 2. FIG. 3 is a perspective view of the side chassis structure. FIG. 3 mainly shows the engine room E. FIG. 4 is a front view of the side chassis structure. FIG. 5 is a perspective view of the side chassis structure. An edge cover 15 is removed from the side chassis structure shown in FIG. 5. The front side frame 1 is described with reference to FIGS. 1 to 5.

Each of the two front side frames 1 has a substantially rectangular cross-section (a closed cross-section structure). Each of the two front side frames 1 is situated in front of the dash panel (not shown) by which a front end of the cabin is partitioned. One of the two front side frames 1 extends in the front-rear direction of the vehicle V on the left of the engine room E. The other of the two front side frames 1 extends in the front-rear direction of the vehicle V on the right of the engine room E.

The two front side frames 1 extend substantially horizontally from a front end position of the vehicle V rearward. The two front side frames 1 are connected to the vertical wall portion of the dash panel near the rear end of the two front side frames 1. The respective rear end portions of the two front side frames 1 extend along the lower surface of the floor panel (not shown). The respective rear end portions of the two front side frames 1 are downwardly inclined rearward. The respective rear end portions of the two front side frames 1 are connected to the dash panel.

Rear end portions of crush cans (not shown) are fixed to the respective front end portions of the two front side frames 1 via set plates 6. Only the crush cans are crushed to absorb impact energy when a small impact load such as light collision acts on the crush cans. In this case, there is no damage to the front side frames 1.

A bumper reinforcement member (not shown) is mounted to front end portions of the crush cans situated at the left and right portions of the vehicle V. The bumper reinforcement member extends in the vehicle width direction (right and left).

The bumper fascia 4 is situated in front of the bumper reinforcement member. The bumper fascia 4 covers a front region of the bumper reinforcement member. A middle portion in the longitudinal direction of the bumper fascia 4 is supported by the bumper reinforcement member. Left and right end portions of the bumper fascia 4 are supported by the fender panels 3.

The apron reinforcement members 2 are described with reference to FIGS. 1 to 5.

The two apron reinforcement members 2 are situated above the two front side frames 1. The left apron reinforcement member 2 is situated to the left of the left front side frame 1. The right apron reinforcement member 2 is situated to the right of the right front side frame 1. The two apron reinforcement members 2 extend linearly from bases of two hinge pillars 7. The end portions of the two apron reinforcement members 2 are respectively situated at substantially the same position in the front-rear direction of the vehicle V as the rear end portions of the crush cans. Each of the apron reinforcement members 2 includes an upper panel and a lower panel. The upper panel forms an upper-half portion of the apron reinforcement members 2 including an inner wall portion. The lower panel forms a lower-half portion of the apron reinforcement members 2 including an outer wall portion. The upper and lower panels form a closed cross-section. The closed cross-section formed by the upper and lower panels extends in the front-rear direction of the vehicle V.

The apron reinforcement members 2 form a substantially rectangular closed cross-section. The closed cross-section extends from the rear end portion of the apron reinforcement members 2 to a vicinity of the front end. Columnar suspension towers 8 and engine mount frames 9 are situated at the rear end portion of the closed cross-section of the apron reinforcement members 2. The suspension towers 8 and the engine mount frames 9 bridge over the front side frames 1 and the apron reinforcement members 2.

In addition to the substantially rectangular closed cross-section portion, each of the apron reinforcement members 2 forms a substantially triangular closed cross-section. The substantially triangular closed cross-section is situated in front of the substantially rectangular closed cross-section. In front of the substantially triangular closed cross-section, only the upper panel extends. An attachment portion 2a to which a radiator shroud (not shown) is attached to support a radiator is formed on an inner portion of the front end of the upper panel.

As shown in FIGS. 1 to 5, the front end portions of the apron reinforcement members 2 are connected to the front end portions of the front side frames 1 via a connection frame 10, respectively.

As shown in FIG. 4, the connection frame 10 is shaped by the press-processing for a metal sheet material. The connection frame 10 is formed in an inverted-L shape in the front view. The upper end portion of the connection frame 10 has a substantially C-shaped cross-section. The upper end portion of the connection frame 10 is sandwiched between the upper and lower panels of the apron reinforcement members 2. The connection frame 10, the upper and lower panels are connected to be triple layers. The lower end portion of the connection frame 10 has a substantially L-shaped cross-section. The lower end portion of the connection frame 10 is connected to the right portion of the front end portion of the front side frames 1.

The fender stay 11 is situated behind the connection frame 10. The lower end portion of the fender stay 11 is connected to the right portion of the front end portion of the front side frame 1. The fender stay 11 is situated in more right side as the fender stay 11 extends upward. The upper end portion of the fender stay 11 is situated below and on the right of the upper end portion of the connection frame 10.

The bumper fascia 4 and the overfender 5 are described with reference to FIG. 1.

An intermediate portion of the bumper fascia 4, which is made of synthetic resin, is curved so as to protrude forward in the plan view. A grill opening portion is formed in a front portion of the bumper fascia 4. A wind when the vehicle runs is introduced into the engine room E through the grill opening portion. The intermediate portion of the bumper fascia 4 is supported by the bumper reinforcement member. The left and right end portions of the bumper fascia 4 are supported by the fender panels 3.

The left and right end portions of the bumper fascia 4 are bent inward in the vehicle width direction to form vertical wall portions. The vertical wall portions of the bumper fascia 4 faces vertical wall portions of the fender panels 3, a slight gap being formed between the vertical wall portions of the bumper fascia 4 and the fender panels 3. The distal portions of the vertical wall portions of the bumper fascia 4 are bent forward to form flange portions. The right and left flange portions are connected to a pair of upper and lower support portions of the fender panels 3 via two clips.

The overfender 5, which is made of synthetic resin, is formed in partial circular ring shape in the side view. The left and right end portions of the overfender 5 are bent inward in the vehicle width direction to form vertical wall portions. The vertical wall portions of the overfender 5 face vertical wall portions (which are described below) of the fender panels 3, a slight gap being formed between the vertical wall portions of the overfender 5 and the fender panels 3. The distal portion of the vertical wall portions of the overfender 5 is bent downward to form a flange portion. The flange portion of the overfender 5 is connected to the support portions of the fender panels 3 via clips (e.g. 14 clips).

The fender panel 3 is described with reference to FIGS. 1 to 5.

The fender panel 3 covers the right side of the apron reinforcement member 2 from the top to the bottom. The fender panel 3 is formed as a single component from a metal sheet material (e.g. an aluminum alloy sheet material) by the press processing which uses metal molds.

The fender panel 3 becomes more distant from the apron reinforcement member 2 toward the right as the panel extends forward in the plan view. The fender panel 3 includes a side wall portion 21, a first flange portion 25, a second flange portion 26 and a third flange portion 27. The side wall portion 21 is a right design surface of the vehicle V. The first to third flange portions 25, 26, 27 are continuous from the side wall portion 21 via the vertical wall portions.

The side wall portion 21 includes a tapering distal portion, a linear portion and an arch portion. The distal portion is formed at the upper portion of the front end side of the side wall portion 21. The distal portion extends along the inside of a longitudinal headlamp to a position near the rear end of the bumper reinforcement member. The linear portion is positioned at a lower portion of the front end side of the side wall portion 21. The linear portion is inclined upwardly to the front. The arch portion forms a wheel arch at a lower-end side portion of the side wall portion 21.

As shown in FIG. 2, the first flange portion 25 includes a flat surface portion substantially perpendicular to the right and left directions. Bolt openings are formed in the flat face portion. The first flange portion 25 is fastened to the upper end portion of the fender stay 11 with bolts b1.

The second flange portion 26 includes a flat surface portion, which is substantially perpendicular to the right and left directions, and bolt holes which are formed in the flat surface portion. The lower end portion on the front side of the second flange portion 26 is fastened to the upper end portion of the fender stay 11 with the bolts b1. A rear-side lower end portion of the second flange portion 26 is fastened with bolts b2 to a bracket fitted to the hinge pillar 7.

As shown in FIG. 5, the third flange portion 27 is spaced upward from the upper panel of the apron reinforcement members 2. The third flange portion 27 extends leftward from the lower end portion of the vertical wall portion continuous with the upper end portion of the side wall portion 21. The third flange portion 27 is fastened with bolts b3 to first to third brackets 12, 13, 14 fixedly attached to the upper panel of the apron reinforcement member 2.

Three attachment portions 27a to 27c and four support portions 27d to 27g are formed in the third flange portion 27.

The front attachment portion 27a has a bolt hole at a position in correspondence to the first bracket 12. The intermediate attachment portion 27b has a bolt hole at a position in correspondence to the second bracket 13. The rear attachment portion 27c has a bolt hole at a position in correspondence to the third bracket 14.

The four support portions 27d to 27g have clip openings. The clip openings are formed substantially at regular intervals in the front-rear direction. The four support portions 27d to 27g support the edge cover 15 with four clips.

The second and third brackets 13, 14 are described with reference to FIGS. 1 to 5.

The second and third brackets 13, 14 are substantially structurally identical. Each of the second and third brackets 13, 14 includes a main body, a front leg portion 13a, 14a and a rear leg portion 13b, 14b. The main bodies of the second and third brackets 13, 14 respectively overlap the intermediate attachment portion 27b and the rear attachment portion 27c. The front leg portions 13a, 14a extend downward from the front end portion of the respective main bodies, and are connected to the apron reinforcement member 2. The rear leg portions 13b, 14b extend downward from the rear end portion of the main bodies, and are connected to the apron reinforcement member 2.

Longitudinal opening portions are formed in the front leg portions 13a, 14a and rear leg portions 13b, 14b. Accordingly, crushing deformation happens to the leg portions 13a, 13b, 14a, 14b when a load exceeding a predetermined magnitude acts downward on the intermediate attachment portion 27b and the rear attachment portion 27c of the fender panel 3.

The first bracket 12 is described with reference to FIGS. 1 to 5.

Crushing deformation happens to the first bracket 12 when a load of a predetermined magnitude acts downward on the front attachment portion 27a of the fender panel 3. Bending deformation happens to the first bracket 12 after the crushing deformation when a load exceeding the predetermined load acts.

As shown in FIGS. 1 to 5, the first bracket 12 is supported by the upper panel of the apron reinforcement member 2 at a position where the apron reinforcement member 2 is connected to the connection frame 10.

Figure 6:
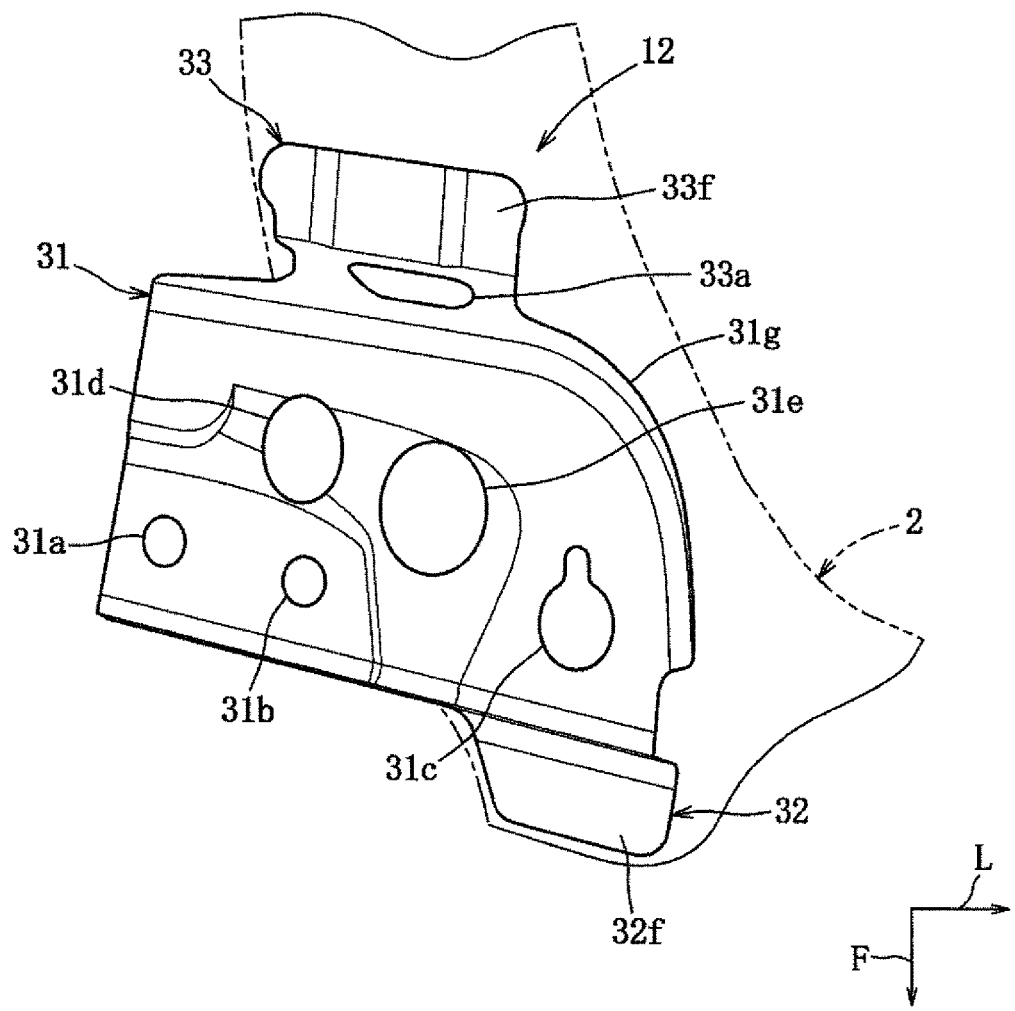
FIG. 6 is a plan view of a first bracket.
Figure 7:
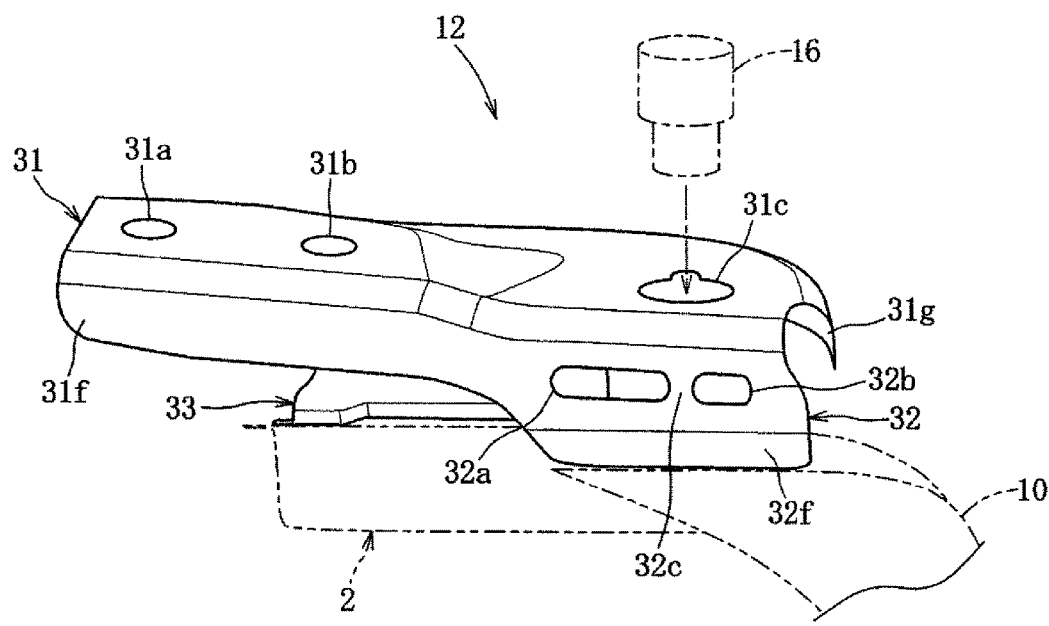
FIG. 7 is a perspective view of the first bracket (front and top).
Figure 7:
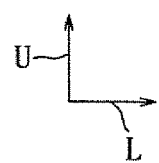
Figure 8:
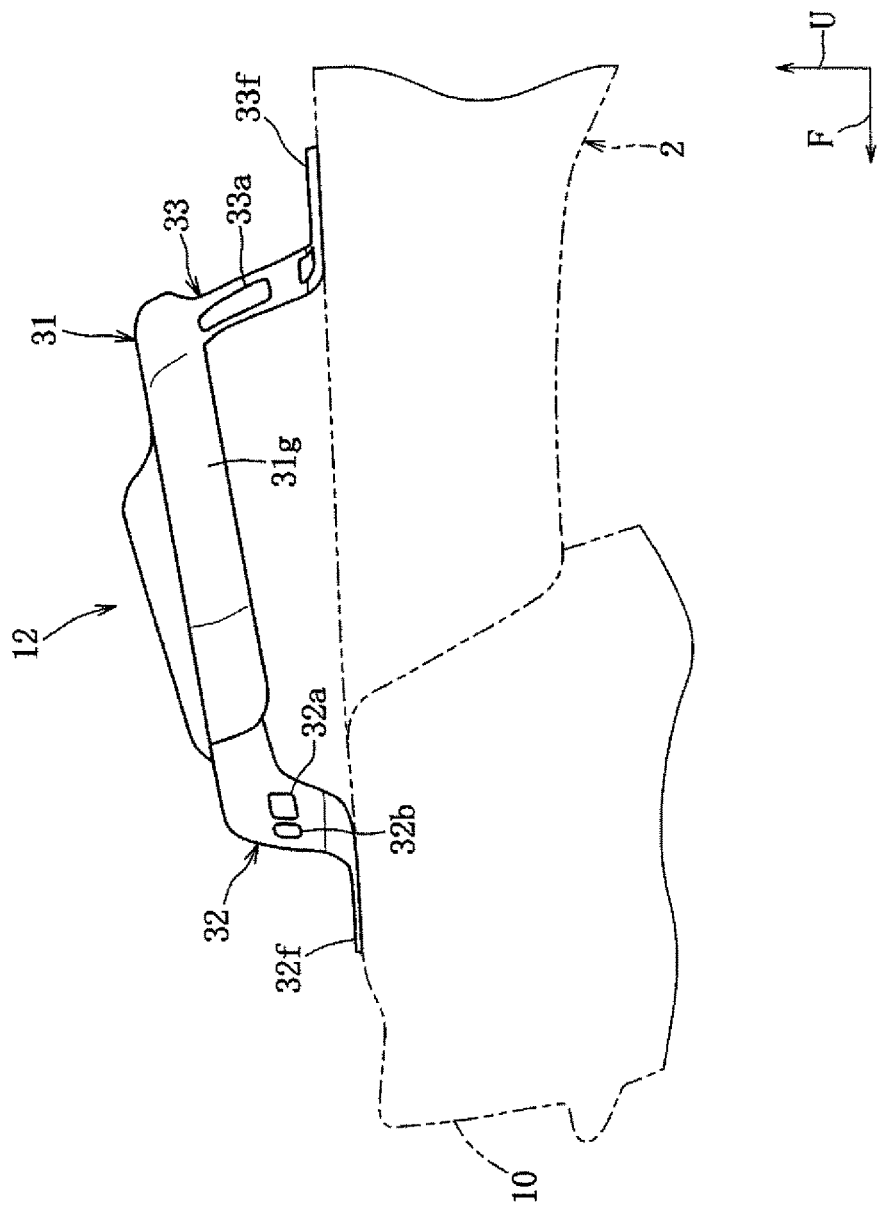
FIG. 8 is a left view of the first bracket.
Figure 9:
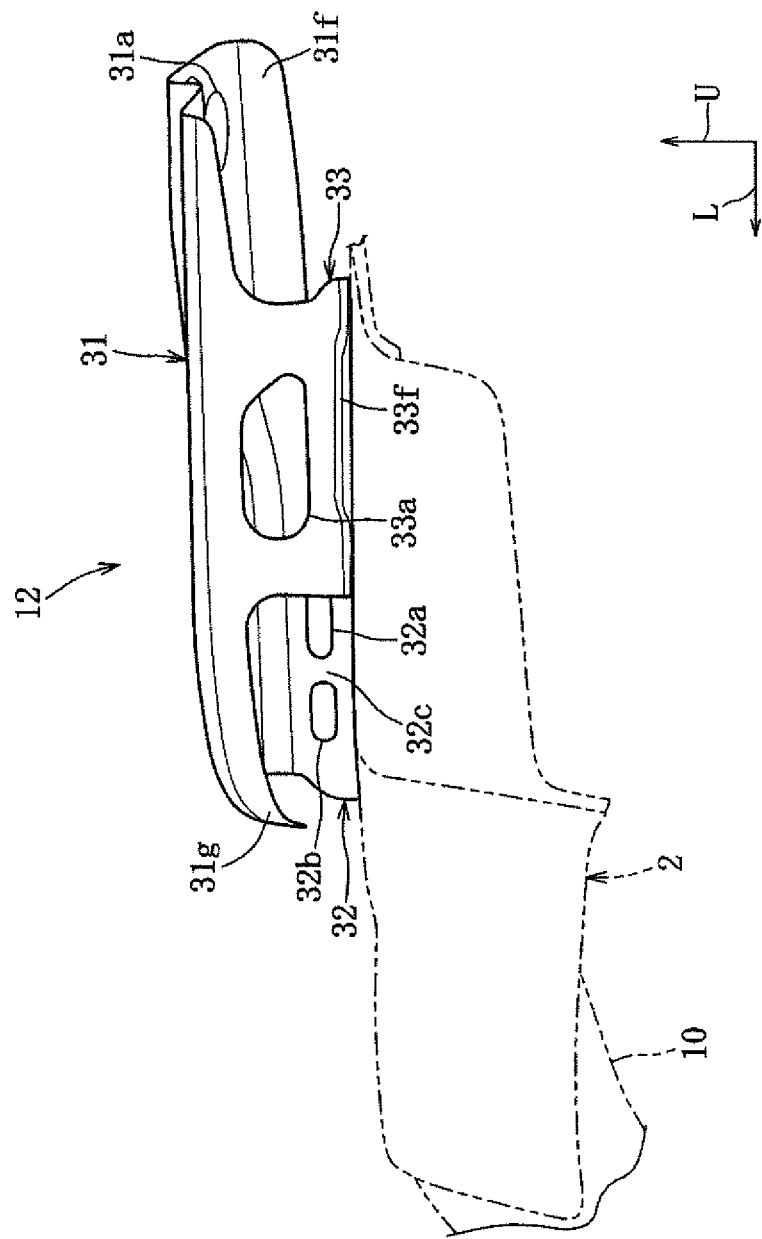
FIG. 9 is a back view of the first bracket.

FIG. 6 is a plan view of the first bracket 12. FIG. 7 is a perspective view (front and top) of the first bracket 12. FIG. 8 is a left view of the first bracket 12. FIG. 9 is a back view of the first bracket 12. The first bracket 12 is further described with reference to FIGS. 5 to 9.

The first bracket 12 is integrally formed by the press-processing for a metal sheet material. The first bracket 12 includes a main body 31, a front leg portion 32 and a rear leg portion 33. The front leg portion 32 is continuous with the front end portion of the main body 31. The rear leg portion 33 is continuous with the rear end portion of the main body 31.

The main body 31 is arranged substantially horizontally. The main body 31 includes a first support portion 31a, a second support portion 31b, a stopper attachment portion 31c, a first opening portion 31d (brittle portion) and a second opening portion 31e (brittle portion). The first support portion 31a supports the front attachment portion 27a (c.f. FIG. 5) via the bolt b3 which is inserted through the bolt hole in the front attachment portion 27a. The second support portion 31b supports the headlight unit (not shown) via a bolt. The stopper attachment portion 31c supports a hood stopper 16 (c.f. FIG. 7).

As shown in FIG. 6, the stopper attachment portion 31c is arranged at a reference position of the main body 31. The stopper attachment portion 31c is formed at a left position in the front end of the main body 31. The first and second support portions 31a, 31b protrude upward from the reference position of the main body 31. The first support portion 31a is situated at a right position in the front end of the main body 31. The second support portion 31b is situated between the first support portion 31a and the stopper attachment portion 31c. A surface portion which includes the first and second support portions 31a, 31b is slightly inclined toward the front. Accordingly, the first bracket 12 may efficiently absorb an impact force. Opening portions (not shown) in correspondence to the upper panel of the apron reinforcement member 2 and the lower end portion of the hood stopper 16 of the connection frame 10 are formed below the stopper attachment portion 31c. Accordingly, the hood stopper 16 is less likely to interfere with the upper panel of the apron reinforcement member 2 when downward crushing deformation happens to the first bracket 12.

The first and second opening portions 31d, 31e are formed in an inclined portion behind the first and second support portions 31a, 31b. The first opening portion 31d is situated behind the second support portion 31b. The second opening portion 31e is situated behind an intermediate portion between the second support portion 31b and the stopper attachment portion 31c. The first and second opening portions 31d, 31e contribute to a weight reduction of the first bracket 12.

The main body 31 includes a vertical wall portion 31f and a rear vertical wall portion 31g. The vertical wall portion 31f extends vertically downward from the front end portion of the right end portion of the main body 31, and is continuous with the front leg portion 32. The rear vertical wall portion 31g extends vertically downward from the rear end portions of the left and right end portions of the main body 31, and is continuous with the rear leg portion 33.

The front leg portion 32 extends vertically downward from the front end portion of the left end portion of the main body 31, and is connected to the upper panel of the apron reinforcement member 2. As shown in FIG. 7, the front leg portion 32 has a first slotted hole 32a (outer slotted hole), a second slotted hole 32b (inner slotted hole), an intermediate wall portion 32c and a flange portion 32f.

The first slotted hole 32a is formed in a right end portion of the mid-level portion of the front leg portion 32. The long axis of the first slotted hole 32a extends from side to side. The second slotted hole 32b is formed on the left side of the first slotted hole 32a. The long axis of the second slotted hole 32b is positioned on substantially the same line as the long axis of the first slotted hole 32a. The long axis of the second slotted hole 32b is shorter than the long axis of the first slotted hole 32a. The long axes of the first and second slotted holes 32a, 32b and the vertical wall portion 31f may be inclined upward as they extend outward in the vehicle width direction. One half or more of the vertical wall portion 31f from the inside in the vehicle width direction may be positioned on the same line as the upper edge of the first slotted hole 32a. Accordingly, the fender panel 3 is supported at a higher position than the support position of the hood stopper 16.

The intermediate wall portion 32c is formed between the first and second slotted holes 32a, 32b. The right/left direction position of the right/left center line of the intermediate wall portion 32c is substantially the same as the right/left direction position of the center of the stopper attachment portion 31c. Accordingly, when the hood is closed, the load which is input to the hood stopper 16 propagates in the order of the main body 31, the intermediate wall portion 32c and the apron reinforcement member 2 to be distributed on the chassis side.

The flange portion 32f extends forward from the lower end portion of the front leg portion 32. The flange portion 32f is welded to the upper panel of the apron reinforcement member 2.

The rear leg portion 33 extends vertically downward from the rear end portion of the center portion of the main body 31, and is connected to the upper panel of the apron reinforcement member 2. As shown in FIG. 9, the rear leg portion 33 includes a rear slotted hole 33a and a flange portion 33f.

The rear slotted hole 33a is formed in a center portion of the mid-level portion of the rear leg portion 33. The long axis of the rear slotted hole 33a extends from side to side. The right/left direction position of the rear slotted hole 33a is set so as to overlap the right/left direction position of the center of the second opening portion 31e. In addition, the right/left direction position of the rear slotted hole 33a is set so as to partially overlap the right and left direction position of the first opening portion 31d. The flange portion 33f extends rearward from the lower end portion of the rear leg portion 33. The flange portion 33f is welded to the upper panel of the apron reinforcement member 2. Accordingly, bending deformation happens from a position near the first slotted hole 32a and near the first and second opening portions 31d, 31e after the crushing deformation of the front and rear leg portions 32, 33.

The operation and effect of the side chassis structure of the vehicle V are described.

The second and first slotted holes 32b, 32a are formed in the front leg portion 32 of the first bracket 12. The second slotted hole 32b has a long axis which extends from side to side. The first slotted hole 32a is formed on the right of the second slotted hole 32b. The long axis of the first slotted hole 32a is longer than the long axis of the second slotted hole 32b. Accordingly, downward crushing deformation happens to the front leg portion 32 when a downward load acts on the first bracket 12 from above the first bracket via the hood in a first deformation period of the first bracket 12 so that an impact force is absorbed. Bending deformation happens to the main body 31 from a position near the first slotted hole 32a so that the impact force is absorbed in a latter deformation period of the first bracket 12. Consequently, a designer may make the first bracket 12 effectively absorb an impact force even under a short vertical length of the first bracket 12.

The side chassis structure includes the stopper attachment portion 31c to which the hood stopper 16 is attached. The stopper attachment portion 31c is formed at a position in correspondence to the right/left direction position of the intermediate wall portion 32c situated between the first and second slotted holes 32a, 32b. Accordingly, when the hood is closed, a resultant load may escape to the apron reinforcement member 2 via the intermediate wall portion 32c. Accordingly, the side chassis structure may effectively receive a load from the hood without interference with crushing deformation of the front leg portion 32.

The vertical wall portion 31f extends vertically downward from the front end portion of the right portion of the main body 31, and is continuous with the front leg portion 32. The lower end portion of the vertical wall portion 31f is substantially leveled in height with the first and second slotted holes 32a, 32b. Accordingly, the first and second slotted holes 32a, 32b are formed by utilizing a portion in correspondence to the vertical wall portion 31f of the front leg portion 32. Therefore, the side chassis structure may appropriately support the fender without interference with crushing deformation of the front leg portion 32.

The first and second opening portions 31d, 31e are formed on the right of the front leg portion 32 of the main body 31 and on the left of the first support portion 31a. When a downward load acts on the first bracket 12 from above the first bracket 12, bending deformation happens to the main body 31 from a position on the right of the front leg portion 32 and the left of the first support portion 31a.

A partial modification of the aforementioned embodiment is described.

(1) The front (first) bracket among the three brackets supporting the upper end portion of the fender panel has been described in the context of the aforementioned embodiment. The bracket structure described in the context of the aforementioned embodiment may be applied to the front bracket and the intermediate (second) bracket. The bracket structure described in the context of the aforementioned embodiment may be applied to three or more brackets.

(2) Each of the first and second slotted holes described in the context of the aforementioned embodiment has an elliptical shape. However, a hole which has a horizontal long axis and a vertical short axis may be used instead of an elliptical hole. For example, the hole may be a flattened oval.

(3) With regard to the aforementioned embodiment, the first and second openings are used as brittle portions. However, a structure which is more brittle than other portions may be used as the brittle portion, instead of the first or second opening. The brittle portion may be a region in which small holes are formed. Alternatively, the brittle portion may be a region thinner than other portions.

(4) A person skilled in the art may incorporate various modifications into the aforementioned embodiment without departing from the spirit of the present invention. The principles of the aforementioned embodiment also include such modifications.

The exemplary side chassis structure described in the context of the aforementioned embodiment mainly includes the following features.

The side chassis structure described in the context of the aforementioned embodiment includes an apron reinforcement member which extends in a front-rear direction of a chassis; a fender panel situated so as to cover an outside of the apron reinforcement member in the vehicle width direction; and brackets connected to the fender panel. The fender panel is supported on the apron reinforcement member via the brackets. At least one of the brackets includes (i) a main body having a support portion which supports the fender panel; (ii) a front leg portion which extends vertically downward from the front end portion of the inner portion of the main body in the vehicle width direction, the front leg portion being attached to the apron reinforcement member; and (iii) a rear leg portion which extends vertically downward from the rear end portion of the main body, the rear leg portion being attached to the apron reinforcement member. The support portion is formed outside the main body in the vehicle width direction. (a) An inner slotted hole having a long axis extending in the vehicle width direction, and (b) an outer slotted hole, which is formed outside the inner slotted hole in the vehicle width direction are formed in the front leg portion, the outer slotted hole having a long axis longer than the long axis of the inner slotted hole.

According to the aforementioned configuration, since the inner slotted hole, of which the long axis extends in the vehicle width direction, and the outer slotted hole, which is formed outside the inner slotted hole in the vehicle width direction, are formed in the front leg portion of the bracket, the outer slotted hole having a long axis which is longer than the long axis of the inner slotted hole, downward crushing deformation happens to the front leg portion in a first deformation period of the bracket during which a downward load acts on the bracket from above the bracket. Consequently, the front leg portion may absorb an impact force. In the latter deformation period of the bracket, bending deformation happens to the main body so that the impact force is absorbed, the bending deformation starting from a position near the outer slotted hole. Accordingly, a designer may shorten a vertical length of the bracket which may effectively absorb the impact force.

With regard to the aforementioned configuration, the main body may include a stopper attachment portion to which the hood stopper is attached. The front leg portion may include an intermediate wall portion situated between the inner and outer slotted holes. The stopper attachment portion may be formed at a position in correspondence to the intermediate wall portion in the vehicle width direction.

According to the aforementioned configuration, a load happened when the hood is closed may escape to the apron reinforcement member via the intermediate wall portion. Accordingly, the side chassis structure may appropriately receive the load from the hood without interference with crushing deformation of the front leg portion.

With regard to the aforementioned configuration, the main body may include a vertical wall portion continuous with the front leg portion. The vertical wall portion may extend vertically downward from the front end portion of the outside portion of the main body in the vehicle width direction and include a lower end portion which is substantially leveled in height with the inner and outer slotted holes.

According to the aforementioned configuration, the inner and outer slotted holes are formed so as to be substantially as high as the lower end portion of the vertical wall portion. Accordingly, the side chassis structure may appropriately support the fender panel without interference with crushing deformation of the front leg portion.

With regard to the aforementioned configuration, the main body may include a brittle portion more brittle than other portions of the main body. The brittle portion may be situated outside the front leg portion in the vehicle width direction and inside the support portion in the vehicle width direction.

According to the aforementioned configuration, bending deformation may happen to the main body from a position outside the front leg portion and inside the support portion in the vehicle width direction in the presence of a downward load acting on the bracket from above the bracket.

INDUSTRIAL APPLICABILITY

The principles of the aforementioned embodiment may be preferably utilized for various vehicle designs.

The invention claimed is:

1. A side chassis structure comprising:
an apron reinforcement member extending in a front-rear direction of a chassis;
a fender panel situated so as to cover an outside of the apron reinforcement member in a vehicle width direction; and
brackets connected to the fender panel,
wherein the fender panel is supported on the apron reinforcement member via the brackets,
wherein at least one of the brackets includes
a main body having a support portion which supports the fender panel,
a front leg portion extending vertically downward from a front end portion of an inner portion of the main body in the vehicle width direction, the front leg portion being attached to the apron reinforcement member, and
a rear leg portion extending vertically downward from a rear end portion of the main body, the rear leg portion being attached to the apron reinforcement member,
wherein the support portion is formed outside the main body in the vehicle width direction, and
wherein the front leg portion has an inner slotted hole having a long axis extending in the vehicle width direction, and an outer slotted hole which is formed outside the inner slotted hole in the vehicle width direction, the outer slotted hole having a long axis longer than the long axis of the inner slotted hole.

2. The side chassis structure according to claim 1,
wherein the main body includes a stopper attachment portion to which a hood stopper is attached,
wherein the front leg portion includes an intermediate wall portion situated between the inner and outer slotted holes, and
wherein the stopper attachment portion is formed at a position in correspondence to the intermediate wall portion in the vehicle width direction.

3. The side chassis structure according to claim 2,
wherein the main body includes a vertical wall portion continuous with the front leg portion in the vehicle width direction, and
wherein the vertical wall portion extends vertically downward from a front end portion of an outside portion of the main body in the vehicle width direction, the vertical wall portion including a lower end portion which is substantially leveled in height with the inner and outer slotted holes.

4. The side chassis structure according to claim 3,
wherein the main body includes a brittle portion more brittle than other portions of the main body, and
wherein the brittle portion is situated between the front leg portion and the support portion in the vehicle width direction.

5. The side chassis structure according to claim 2,
wherein the main body includes a brittle portion more brittle than other portions of the main body, and
wherein the brittle portion is situated between the front leg portion and the support portion in the vehicle width direction.

6. The side chassis structure according to claim 5, wherein the brittle portion is an opening portion.

7. The side chassis structure according to claim 1,
wherein the main body includes a vertical wall portion continuous with the front leg portion in the vehicle width direction, and
wherein the vertical wall portion extends vertically downward from a front end portion of an outside portion of the main body in the vehicle width direction, the vertical wall portion including a lower end portion which is substantially leveled in height with the inner and outer slotted holes.

8. The side chassis structure according to claim 7,
wherein the main body includes a brittle portion more brittle than other portions of the main body, and
wherein the brittle portion is situated between the front leg portion and the support portion in the vehicle width direction.

9. The side chassis structure according to claim 8, wherein the brittle portion is an opening portion.

10. The side chassis structure according to claim 1,
wherein the main body includes a brittle portion more brittle than other portions of the main body, and
wherein the brittle portion is situated between the front leg portion and the support portion in the vehicle width direction.

11. The side chassis structure according to claim 10, wherein the brittle portion is an opening portion.

12. The side chassis structure according to claim 1, wherein the outer slotted hole is formed outside the inner slotted hole in the vehicle width direction via an intermediate wall portion.

13. A side chassis structure comprising:
an apron reinforcement member extending in a front-rear direction of a chassis;
a fender panel situated so as to cover an outside of the apron reinforcement member in a vehicle width direction; and
a bracket connected to the fender panel,
wherein the fender panel is supported on the apron reinforcement member via the bracket,
wherein the bracket includes
a main body that is formed in a sheet, arranged substantially horizontally and having a support portion which supports the fender panel,
a front leg portion extending vertically downward from a front end portion of an inner portion of the main body in the vehicle width direction, the front leg portion being attached to the apron reinforcement member, and
a rear leg portion extending vertically downward from a rear end portion of the main body, the rear leg portion being attached to the apron reinforcement member, wherein the support portion is formed outside the main body in the vehicle width direction, and wherein the front leg portion has an inner slotted hole having a long axis extending in the vehicle width direction, and an outer slotted hole which is formed outside the inner slotted hole in the vehicle width direction, the outer slotted hole having a long axis substantially in the vehicle width direction that is longer than the long axis of the inner slotted hole.

14. A side chassis structure comprising:

an apron reinforcement member extending in a front-rear direction of a chassis;

a fender panel situated so as to cover an outside of the apron reinforcement member in a vehicle width direction; and a bracket connected to the fender panel, wherein the fender panel is supported on the apron reinforcement member via the bracket, wherein the bracket includes a main body having a support portion which supports the fender panel, a front leg portion extending vertically downward from a front end portion of the main body in the vehicle width direction, the front leg portion being attached to the apron reinforcement member, and a rear leg portion extending vertically downward from a rear end portion of the main body, the rear leg portion being attached to the apron reinforcement member, wherein the support portion is formed outside the main body in the vehicle width direction, and wherein the front leg portion has an inner slotted hole having a long axis extending in the vehicle width direction, and an outer slotted hole which is formed outside the inner slotted hole in the vehicle width direction, the outer slotted hole having a long axis longer than the long axis of the inner slotted hole.

* * * * *